United States Patent
Kamikatano et al.

(10) Patent No.: US 8,372,316 B2
(45) Date of Patent: Feb. 12, 2013

(54) DISPLAY APPARATUS, MANUFACTURING METHOD THEREOF, PATTERN DISPLAY METHOD, BLIND APPARATUS, AND BLIND METHOD

(75) Inventors: Mitsuru Kamikatano, Sakura (JP); Takashi Tsumanuma, Sakura (JP); Takafumi Kashima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/509,178

(22) Filed: Jul. 24, 2009

(65) Prior Publication Data
US 2009/0286446 A1 Nov. 19, 2009

Related U.S. Application Data

(60) Division of application No. 12/253,659, filed on Oct. 17, 2008, which is a continuation of application No. PCT/JP2007/058622, filed on Apr. 20, 2007.

(30) Foreign Application Priority Data

Apr. 20, 2006 (JP) ................................. 2006-117238
Mar. 2, 2007 (JP) ................................. 2007-052910

(51) Int. Cl.
*B29D 11/00* (2006.01)

(52) U.S. Cl. .......... 264/1.1; 264/2.7; 362/625; 362/623; 362/626

(58) Field of Classification Search .......... 362/608–609, 362/620–627, 555, 97.1–97.4, 561, 339, 362/616; 385/146; 359/831, 837; 264/1.1, 264/2.7

See application file for complete search history.

(56) References Cited

U.S. PATENT DOCUMENTS

| 5,618,096 A * | 4/1997 | Parker et al. | 362/629 |
| 6,454,452 B1 | 9/2002 | Sasagawa et al. | |
| 7,106,528 B2 * | 9/2006 | Ohmori et al. | 359/742 |
| 7,611,648 B2 * | 11/2009 | Wolfing et al. | 264/2.4 |
| 2002/0130427 A1 * | 9/2002 | Kobayashi et al. | 264/1.6 |
| 2002/0181224 A1 * | 12/2002 | Tahara et al. | 362/31 |
| 2003/0223218 A1 * | 12/2003 | Kawakami | 362/31 |
| 2004/0022050 A1 * | 2/2004 | Yamashita et al. | 362/31 |
| 2004/0042195 A1 * | 3/2004 | Hwang | 362/31 |
| 2007/0274097 A1 * | 11/2007 | Chen et al. | 362/609 |

FOREIGN PATENT DOCUMENTS

| EP | 0650010 A1 | 4/1995 |
| JP | 48-010920 B | 4/1973 |
| JP | 48-45577 U | 6/1973 |
| JP | 52-63386 U | 5/1977 |
| JP | 52-106086 U | 8/1977 |
| JP | 3087723 | 5/2002 |
| JP | 3087723 U | 8/2002 |
| JP | 2003-519810 A | 6/2003 |
| JP | 2006-75362 A | 3/2006 |
| WO | 01/50444 A1 | 7/2001 |

* cited by examiner

Primary Examiner — Robert May
(74) Attorney, Agent, or Firm — Sughrue Mion, PLLC

(57) ABSTRACT

The present invention relates to a manufacturing method of a display apparatus having a display portion that is made of dot-like reflection portions. The method comprising steps of: heating at least one of a blade portion of a machining tool and a light guide plate, descending the machining tool along a specific formation direction of the blade portion all through this descending step to press the blade portion into a back surface of the light guide plate, ascending the machining tool along a specific formation direction of the blade portion all through this ascending step to pull out the blade portion from the light guide plate, moving the machining tool horizontally, and arranging at least one light source along at least one edge face of the light guide plate. The steps of descending, ascending, and horizontally moving the machining tool are performed repeatedly to form the dot-like reflection portions.

4 Claims, 12 Drawing Sheets

DISPLAY APPARATUS, MANUFACTURING METHOD THEREOF, PATTERN DISPLAY METHOD, BLIND APPARATUS, AND BLIND METHOD

This application is a Divisional Application of U.S. patent application Ser. No. 12/253,659, filed Oct. 17, 2008, which is a Continuation of International Patent Application No. PCT/JP2007/058622 filed Apr. 20, 2007, which claims priority to Japanese Patent Application Nos. 2007-052910 filed Mar. 2, 2007 and 2006-117238 filed Apr. 20, 2006. The contents of all are incorporated herein by reference.

BACKGROUND OF THE INVENTION

1. Field of the Invention

The present invention relates to a display apparatus for use in displaying, a manufacturing method thereof, a pattern display method using this display apparatus, a blind apparatus and a blinding method using this display apparatus.

2. Background Art

In recent years, more LEDs (light emitting diodes) have come to be used in various applications as highly efficient, long-life light sources.

LEDs are point-like light sources with directivity. In single use, their application is limited to spot illumination. Therefore, they are often combined with a light guide plate such as a transparent resin plate to be used as a linear or planar light source. Examples of this include a liquid crystal backlight and a light panel for advertisement.

In addition, a display apparatus with transparency and excellent in designability includes one in which a surface of a light guide plate is made rough by laser machining or etching to form a display portion that show a graphic form or a logo.

In this display apparatus, light is irradiated from a light source provided on an edge face of the light guide plate for causing the display portion to emerge. It is used for displaying or the like.

Furthermore, a display apparatus with a display portion in which LED elements are provided in a predetermined arrangement between two transparent glass plates is also in use (see Patent Document 1).

Patent Document 1: European Patent No. EP0995199

DISCLOSURE OF THE INVENTION

Problems Solved by the Invention

In the aforementioned display apparatus with a rough-surfaced display portion, light is scattered in the display portion. Therefore, luminance of the display portion per unit area is low, resulting in insufficient visibility. To enhance visibility, it is necessary to widen the area of the display portion.

However, if the display portion has a large opaque area, it becomes impossible to see the background through. This impairs transparency, which is a feature of this display apparatus, leading to a decrease in its value.

In a display apparatus provided with LED elements between transparent glass plates, only the LED elements shield transmitting light. This offers transparency superior to that of the aforementioned one. However, an electrode wiring pattern is more complicated. Therefore, it is very expensive.

Furthermore, to change the design of the display portion, it is necessary to replace the entirety of the display portion including the light source (the LED elements), unlike a display apparatus in which the light source and the light guide plate are separate entities.

The present invention has been achieved in view of the above circumstances, and has an object to provide a display apparatus which is excellent in transparency, has a display portion visually recognizable with ease, can be manufactured at a low cost, and allows a modification in a display portion with ease, and to provide a manufacturing method thereof. Furthermore, the present invention has another object to provide a pattern display method using this display apparatus, and a blind apparatus and a blinding method using this display apparatus.

Means for Solving the Problem

A display apparatus according to the present invention includes: a light guide plate; and at least one light source that is provided on at least one edge face of the light guide plate. In the light guide plate, a display portion that is made of one or more dot-like reflection portions with a reflection surface for reflecting a light beam emitted from the light source and incident from the edge face, to a surface, is formed, and reflected light beams from the dot-like reflection portions of the display portion being configured to be visually recognizable.

In this display apparatus, it is preferable that the dot-like reflection portion be made of a dot-like notch formed in the light guide plate.

Furthermore, it is preferable that the reflection surface of the dot-like reflection portion be a smooth plane.

Furthermore, in this display apparatus, it is preferable that the display portion be made of a plurality of dot-like reflection portions and be configured so that reflected light beams from the dot-like reflection portions are visually recognizable as forming a predetermined pattern.

Furthermore, in this display apparatus, it is preferable that the dot-like reflection portions be arranged so as to form a letter, a sign, a graphic form, a designed pattern, or a combination of two or more of these.

Furthermore, in this display apparatus, it is preferable that a plurality of the light guide plates be provided and that the light guide plates be stacked.

Furthermore, in this display apparatus, it is preferable that a plurality of the light guide plates be provided and that the light guide plates be disposed in a spaced-apart manner in the thickness direction.

Furthermore, in this display apparatus, it is preferable that a plurality of the light guide plates be provided and that the light guide plates be disposed side by side within one plane.

Furthermore, in this display apparatus, it is preferable that at least one of the light guide plates be formed with at least one part thereof being curved.

Furthermore, in this display apparatus, it is preferable that the reflection surface of the dot-like reflection portion have an angle of 45 degrees or more and 60 degrees or less with respect to a surface of the light guide plate.

Furthermore, in this display apparatus, it is preferable that the dot-like reflection portion be configured to have a substantially rectangular shape seen in a plane, a width to height ratio thereof being in a range of 10:1 to 1:1.

Furthermore, in this display apparatus, it is preferable that the dot-like reflection portion have a shape, seen in a plane, selected from a substantial rectangle, a trapezoid, a triangle, a circle, or a circle having a part which is cut out.

Furthermore, in this display apparatus, it is preferable that the light source be provided on the respective light guide plates.

Furthermore, in this display apparatus, it is preferable that a relative position of the light source with respect to the light guide plates be configured to be variable from a position capable of entering a light beam into one of the light guide plates to a position capable of entering a light beam into one of the other light guide plates.

Furthermore, in this display apparatus, it is preferable that the light source be extendingly formed along an extension direction of the light guide plate.

Furthermore, in this display apparatus, it is preferable that the light source be made of a plurality of light emitting diodes arranged in a predetermined direction.

A manufacturing method of the display apparatus according to the present invention is a manufacturing method of the above-mentioned display apparatus, including: using a machining tool having one or more blade portions in the shape in accordance with a shape of the one or more of the dot-like reflection portions; heating one or both of the blade portions and the light guide plate to the softening point of a material of the light guide plate or higher; and pressing the blade portions into the light guide plate to form the dot-like reflection portions.

Furthermore, in the manufacturing method of the display apparatus according to the present invention, a light guide plate in which the dot-like reflection portions are formed is capable of being stamped or injection-molded by a mold on which a raised pattern with a shape in correspondence to the letter, the sign, the graphic form, the designed pattern, or the combination of two or more of these, which is arranged by the dot-like reflection portions of the display portion.

A pattern display method according to the present invention uses: a light guide plate in which a display portion including a pattern made of one or more dot-like reflection portions with a reflection surface; and at least one light source that is provided on at least one edge face of the light guide plate, and enters a light beam from the light source from the edge face of the light guide plate to allow the light beam to exit from a surface after reflection off the one or more dot-like reflection portions, to thereby display one or more reflected light beams of the pattern.

Furthermore, in this pattern display method, it is preferable that a change be imparted to the pattern of the one or more reflected light beams by modifying one or more of the amount of time for light emission, the amount of light emission, and the color of emitted light of the light source.

A blind apparatus according to the present invention includes: a light guide plate; and at least one light source that is provided on at least one edge face of the light guide plate, in which a display portion that is made of one or more dot-like reflection portions with a reflection surface for reflecting a light beam, emitted from the light source and incident from the edge face, to a surface is formed in the light guide plate, one or more reflected light beams from the one or more dot-like reflection portions of the display portion being configured to be visually recognizable.

A blind method according to the present invention uses: a light guide plate in which a display portion made of one or more dot-like reflection portions with a reflection surface; and at least one light source that is provided on at least one edge face of the light guide plate, and enters a light beam from the light source from an edge face of the light guide plate to allow the light beam to exit from a surface of the light guide plate after reflection off the one or more dot-like reflection portions, to thereby lower a background visibility.

Advantageous Effects of the Invention

In the display apparatus of the present invention, dot-like reflection portions with a reflection surface, for example display portions made of dot-like notch(es) are formed in a light guide plate. Therefore, a light beam from the light source is allowed to be reflected off the reflection surfaces of the dot-like reflection portions to exit from the surface.

Most of the light beams from the light source are reflected off the reflection surfaces and exit in substantially a given direction. Consequently, light intensity becomes sufficiently large. Therefore, even in the case of an observation at a distance, excellent visibility is obtained.

Furthermore, the reflection surfaces of the dot-like reflection portions are smooth planes. Therefore, a light beam from the light source is allowed to be reflected off the reflection surfaces of the dot-like reflection portions to exit from the surface.

Furthermore, the dot-like reflection portions have a small area because they are of dot-like shape. Therefore, the transparency of the display apparatus is not impaired.

Furthermore, the display apparatus has a simple structure. Therefore, it is easily manufactured, and has an advantage also in cost.

Moreover, the light guide plate and the light source are separate entities. Therefore, it is easy to replace the light guide plate with a light guide plate with a different display portion.

Furthermore, in the case where a plurality of light guide plates are disposed in the thickness direction, the positions of the plurality of light guide plates in the thickness direction are different from one another. Therefore, a three-dimensional pattern can be displayed. This offers excellent display effects and ornamentability.

Furthermore, when the light beam from the light source is reflected off the dot-like reflection portions to display the aforementioned pattern, a change can be imparted to the pattern of the reflected light beams by controlling one or more of the time for light emission, the amount of light emission, and the color of emitted light of the light source. For example, use of a plurality of light guide plates enables a display in which it looks as if a figure (a pattern) moves, further improving a display effect.

Moreover, if the dot-like reflection portions are increased in number and the light quantity of the light source is made large, not only a function of a display apparatus but also a function of a planar illumination apparatus can be imparted. The reflection portion of the light guide plate is electrically neutral, and hence poses no problem of electric shocks or short circuits, and produces almost no heat. Therefore, the display apparatus is suitable for use as an illumination in an environment in which such phenomena cause a problem.

DESCRIPTION OF THE REFERENCE SYMBOLS 1, 21, 22, 31 to 33, 41 to 43, 51 to 53: light guide plate, 2: dot-like reflection portion, 2a: reflection surface, 3, 23, 24, 34 to 36, 44 to 46, 54 to 56: display portion, 6, 25, 26, 37 to 39, 47 to 49, 57: light source, 12, 12A: blade portion, 13, 13A: machining tool, 70: blind apparatus, a: inclination angle of reflection surface

BEST MODE FOR CARRYING OUT THE INVENTION

Figure 1:
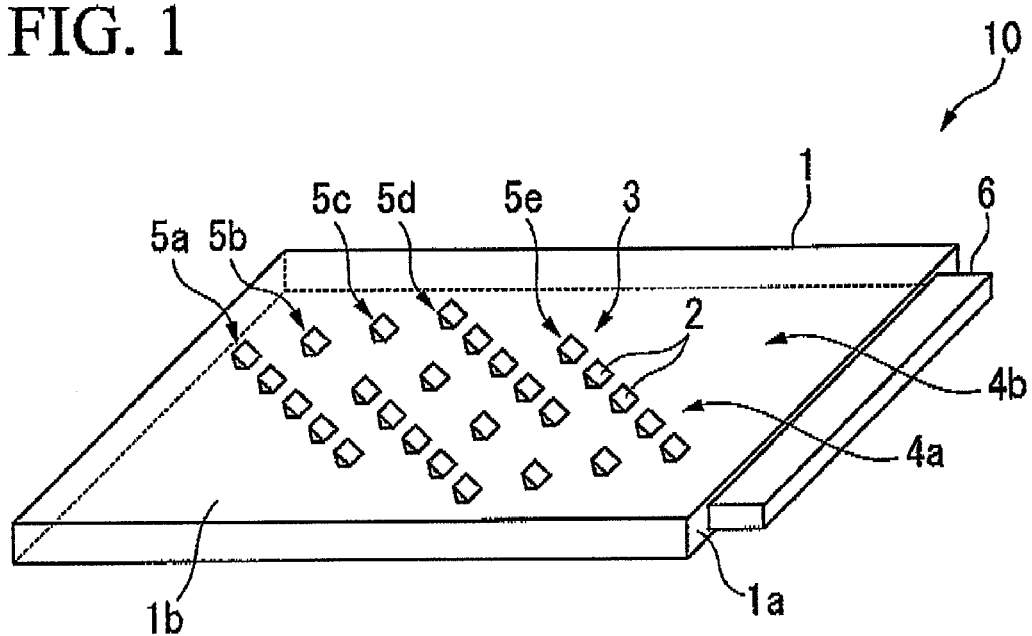
FIG. 1 is a perspective view schematically showing a first embodiment of a display apparatus of the present invention.
Figure 2:
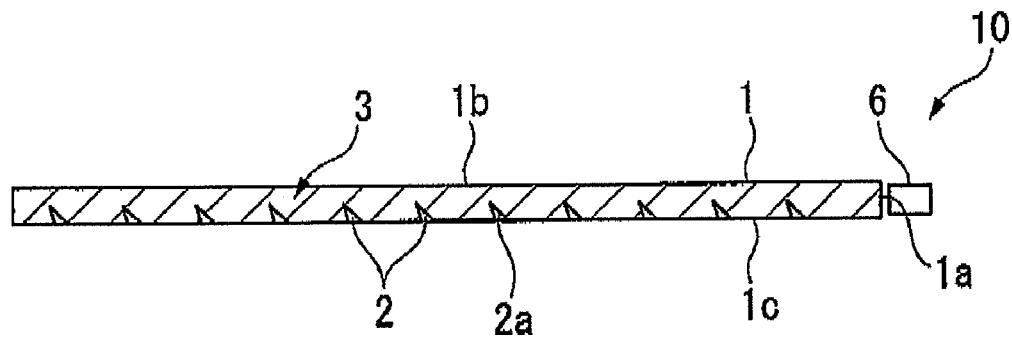
FIG. 2 is a cross-sectional view showing the display apparatus shown in FIG. 1.
Figure 3:
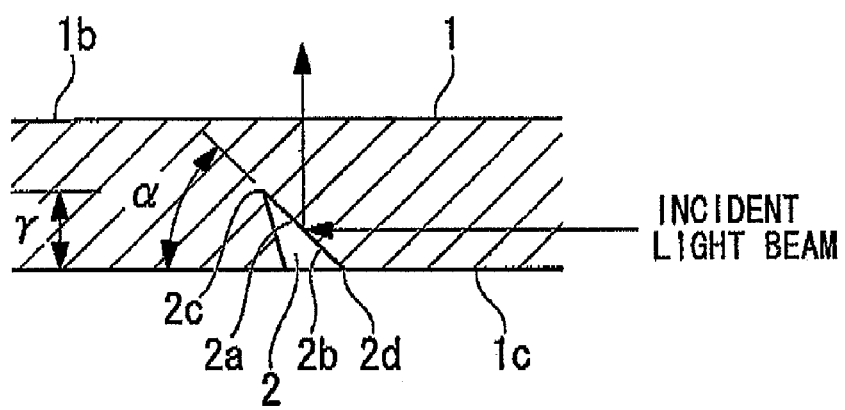
FIG. 3 is an enlarged view of a main part of the display apparatus shown in FIG.
Figure 4:
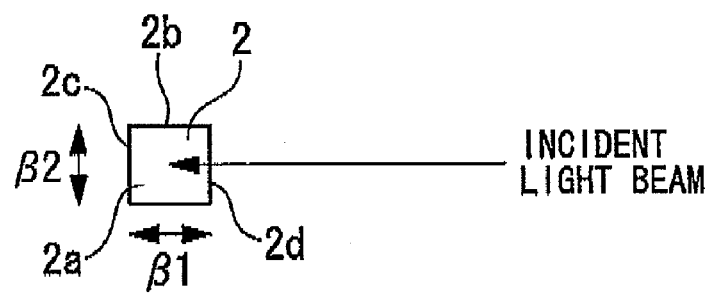
FIG. 4 is a plan view showing a dot-like reflection portion of the display apparatus shown in FIG. 1.

FIG. 1 to FIG. 4 show a display apparatus 10 as a first embodiment of the present invention. FIG. 1 is a perspective view schematically showing the display apparatus 10. FIG. 2 is a cross-sectional view of the display apparatus 10. FIG. 3 is an enlarged view of a main part of the display apparatus 10. FIG. 4 is a plan view of a dot-like reflection portion 2.

The display apparatus 10 includes: a light guide plate 1; and a light source 6 provided on an edge face 1a of the light guide plate 1.

As the light source 6, an LED, an LD (a laser diode), or the like can be used. It is preferable that the light source 6 be extendingly formed along an extending direction of the light guide plate 1. In the example shown in the figure, the light source 6 is extendingly formed along one edge face 1a of the substantially rectangular light guide plate 1.

As the light source 6, for example, one in which a plurality of LEDs are arranged in a direction along the edge face 1a can be used. Exemplary colors of light emitted by the light source 6 include white, red, green, and blue. They can be appropriately selected according to the pattern formed by the dot-like reflection portions 2.

Note that the light source 6 can be provided on one and the other edge faces of the light guide plate 1.

The light guide plate 1 is made of any material as long as it is transparent. A plate made of: a synthetic resin such as an acrylic resin, a polycarbonate resin, a silicone resin, and a cyclopolyolefin resin; a glass plate; or the like may be used. Among them, an acrylic resin is preferable due to its transparency and easy machinability.

The light guide plate 1 has a thickness of for example 0.5 mm to 10 mm. It is preferable that the light guide plate 1 have a light transmittance to a degree that allows people to see the background. Furthermore, in the case of the present embodiment, the light guide plate 1 has a shape of a substantially rectangular plate seen in a plane, as shown in the figures. However, the shape of the light guide plate 1 is not limited to the shape as shown in the figures as long as surfaces which function as an edge face 1a, a surface 1b, and a back surface 1c can be formed.

In the present invention, being transparent means having light transmittance to a degree that allows a visual recognition of the reflected light beam from the dot-like reflection portion 2. This definition is used commonly in the present invention.

On the back surface of the light guide plate 1, a display portion 3 is formed which is made of one or more dot-like reflection portions 2.

As shown in FIG. 3 and FIG. 4, the dot-like reflection portion 2 is a notch formed in the back surface 1c. It has a reflection surface 2a for reflecting a light beam, emitted from the light source 6 and incident from the edge face 1a, to the surface 1b. The dot-like reflection portion 2 is configured to have a shape which allows the light beam from the light source 6 to hit the reflection surface 2a.

In the example shown in the figures, a shape of the dot-like reflection portion 2 seen in a plane is configured to be a substantial rectangle (see FIG. 4). A cross section of the dot-like reflection portion 2 along an incident direction of a light beam from the light source 6 is a triangle with the reflection surface 2a formed on the edge face 1a as a longest edge (see FIG. 3).

The dot-like reflection portion 2 may have any structure as long as it is formed within the light guide plate and reflects a light beam from the light source to the surface. Hence, its structure is not limited to the example shown in the figures. Other than a rectangle, the shape of the dot-like reflection portion 2 seen in a plane may be, for example, a polygon such as a trapezoid, a triangle, or a pentagon, a circle, or a circle having a part thereof cut out.

Figure 5A:
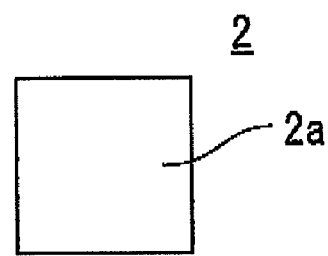
FIG. 5A is a plan view showing an example of a shape of a dot-like reflection portion, seen in a plane.
Figure 5B:
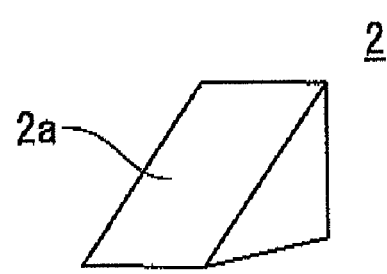
FIG. 5B is a perspective view of the dot-like reflection portion shown in FIG. 5A.
Figure 6A:
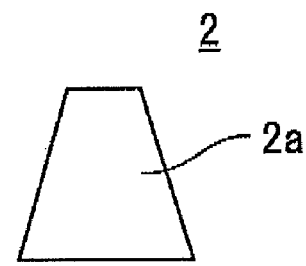
FIG. 6A is a plan view showing an example of a shape of a dot-like reflection portion, seen in a plane.
Figure 6B:
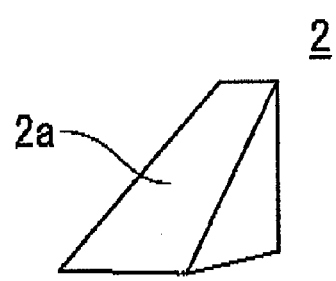
FIG. 6B is a perspective view of the dot-like reflection portion shown in FIG. 6A.
Figure 7A:
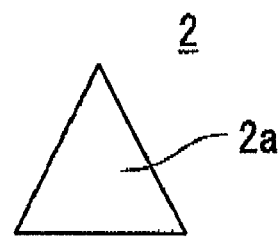
FIG. 7A is a plan view showing an example of a shape of a dot-like reflection portion, seen in a plane.
Figure 7B:
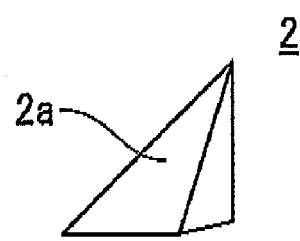
FIG. 7B is a perspective view of the dot-like reflection portion shown in FIG. 7A.
Figure 8A:
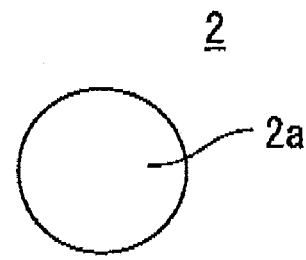
FIG. 8A is a plan view showing an example of a shape of a dot-like reflection portion, seen in a plane.
Figure 8B:
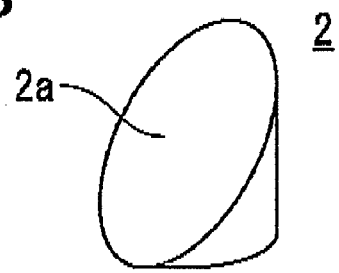
FIG. 8B is a perspective view of the dot-like reflection portion shown in FIG. 8A.
Figure 9A:
FIG. 9A is a plan view showing an example of a shape of a dot-like reflection portion, seen in a plane.
Figure 9B:
FIG. 9B is a perspective view of the dot-like reflection portion shown in FIG. 9A.

Such examples are shown in FIG. 5A to FIG. 9B. FIG. 5A and FIG. 5B show an example of the case where the shape of the dot-like reflection portion 2 seen in a plane is a square, and the cross section along the incident direction of the light beam from the light source 6 is a right-angled isosceles triangle with the reflection surface 2a as the hypotenuse. FIG. 6A and FIG. 6B show an example of the case where the shape of the dot-like reflection portion 2 seen in a plane is a trapezoid. FIG. 7A and FIG. 7B show an example of the case where the shape of the dot-like reflection portion 2 seen in a plane is a triangle. FIG. 8A and FIG. 8B show an example of the case where the shape of the dot-like reflection portion 2 seen in a plane is a circle. FIG. 9A and FIG. 9B show an example of the case where the shape of the dot-like reflection portion 2 seen in a plane is a semicircle. Furthermore, the dot-like reflection portion 2 may be a through-hole formed in the light guide plate, or may be a space portion formed within the light guide plate, as in the example shown in the figure.

The width to height ratio (the aspect ratio) (average value) of the dot-like reflection portion 2 when seen in a plane is preferably in the range of 10:1 to 1:1, more preferably in the range of 5:1 to 1:1.

The width to height ratio denotes a ratio of a longer edge to a shorter edge (longer Edge:shorter edge) of a minimum-area rectangle in which the dot-like reflection portion 2 is inscribed, seen in a plane.

If the width to height ratio is too large, the shape of the light beam from the dot-like reflection portion is recognized not as a dot but as a line, resulting in a decrease in visibility. As shown in FIG. 4, in the case where the shape of the dot-like reflection portion seen in a plane is a rectangle, the width to height ratio denotes a ratio of a longer edge to a shorter edge (longer edge:shorter edge). If β1>β2, then β1:β2. If β1<β2, then β2:β1. If the shape of the dot-like reflection portion seen in a plane is a shape other than a rectangle, the width to height ratio denotes a ratio of a longer edge to a shorter edge (longer edge:shorter edge) of a minimum-area rectangle in which the dot-like reflection portion 2 is inscribed, seen in a plane.

If an inclination angle (an angle α as shown in FIG. 3) of the reflection surface 2a with respect to the surface 1b of the light guide plate 1 is too small, an inclination angle of the exiting light beam becomes large accordingly, decreasing the visibility of the dot-like reflection portion 2 when the display apparatus 10 is seen from the front. If the inclination angle is too large, the incident angle of the light beam exceeds the critical angle, thus increasing the ratio of the light transmitting the reflection surface 2a. Therefore, the reflection efficiency of light is decreased, and hence the utilization efficiency of light is decreased.

As a result, the inclination angle of the reflection surface 2a is preferably 45 degrees or more and 60 degrees or less, more preferably 50 degrees or more and 55 degrees or less. With the inclination angle in the aforementioned range, the reflection efficiency of light can be increased. In addition, the reflected light beam is allowed to exit at an angle close to perpendicularity to the surface 1b to increase the visibility of the dot-like reflection portion 2.

In the examples shown in the figures, the reflection surface 2a is flat. However, at least a part of the reflection surface may be curved. If the reflection surface is curved, there is a case where an exit angle of the reflected light beam has a wide ranges. In this case, the dot-like reflection portion 2 comes to be visually recognizable from a wide range.

The surface roughness (the maximum height Ry) (JIS B 0601-1994) of the reflection surface 2a is preferably 1 μm or less, more preferably 0.1 μm or less. With the surface roughness in this range, the reflection efficiency of light at the reflection surface 2a can be enhanced.

If the height of the dot-like reflection portion 2 (the height γ as shown in FIG. 3) is too small, the visibility of the dot-like reflection portion 2 is lowered. If it is too large, it is not favorable in terms of transparency of the display apparatus 10. Therefore, the average height of the dot-like reflection portions 2 is preferably 0.1 mm to 5 mm, more preferably 0.5 mm to 3 mm.

The ratio (the average value) of the heights of the dot-like reflection portions 2 to the thickness of the light guide plate 1 is favorably 1/10 to 1/1, more preferably 1/5 to 2/3.

Supposing that all the dot-like reflection portions 2 have the same area, there is a tendency that the intensity of the reflected light beam at a dot-like reflection portion 2 farther from the light source 6 is lower than that at a dot-like reflection portion 2 closer to the light source 6. Therefore, it is preferable that the dot-like reflection portion 2 have a larger area as they are farther away from the light source 6, to thereby uniform the intensities of the reflected light beams of the dot-like reflection portions 2.

In the example shown in the figure, a plurality of dot-like reflection portions 2 are arranged to form a predetermined pattern in the display portion 3. The phrase "dot-like reflection portions 2 are arranged to form a predetermined pattern" denotes that the dot-like reflection portions 2 are positioned according to a predetermined rule. The display portion 3 can have a structure in which the dot-like reflection portions 2 are disposed with irregularity, for example, a structure with sections where the dot-like reflection portions 2 are densely disposed and where the dot-like reflection portions 2 are sparsely disposed. The example shown in FIG. 1 has a section 4a where the dot-like reflection portions 2 are densely disposed, and a section 4b where the dot-like reflection portions 2 are sparsely disposed. The densely disposed section 4a is made of five linear arrangement portions 5a to 5e where a plurality of dot-like reflection portions 2 are arranged in a given direction.

It is preferable that a predetermined pattern formed by the dot-like reflection portions 2 be arranged so as to form a letter, a sign, a graphic form, a designed pattern, or a combination of two or more of these.

Note that the dot-like reflection portions 2 may be uniformly disposed over the entirety of the light guide plate 1.

In the display apparatus 10, no constituent element that may impair the transparency of the display apparatus 10 is provided on the surface 1b (or the back surface 1c) of the light guide plate 1. This allows the dot-like reflection portions 2 to be visually recognized as dot-like luminescent spots.

Note that a translucent layer may be provided on the surface 1b (or the back surface 1c) of the light guide plate 1 as long as the dot-like reflection portions 2 are observed as dot-like luminescent spots.

As shown in FIG. 3, in the display apparatus 10, the light beam from the light source 6 is allowed to exit from the surface 1b after it is incident in the light guide plate 1 from the edge face 1a and reflected off the reflection surface 2a of the dot-like reflection portion 2. Seen from the surface 1b, the dot-like reflection portion 2 is observed as a dot-like luminescent spot.

Most of the light beams from the light source 6 are reflected off the reflection surfaces 2a, and are directed in substantially a given direction (in the example shown in the figure, in the direction perpendicular to the surface 1b). Therefore, the light intensity is sufficiently strong. As a result, even in the case of observing the display apparatus 10 at a distance, excellent visibility is obtained.

Furthermore, because the dot-like reflection portions 2 are arranged to form a predetermined pattern, this pattern is visually recognizable by observing it from the surface 1b side.

In this display apparatus 10, the dot-like reflection portion 2 is of a dot-like shape, and hence has a small area. Therefore, the transparency of the display apparatus 10 is not impaired.

Furthermore, the display apparatus 10 has a simple structure. Therefore, it is easily manufactured, and has an advantage also in cost.

Moreover, the light guide plate 1 and the light source 6 are separate entities. Therefore, it is advantageously easy to replace the light guide plate 1 with a light guide plate with a different display portion.

Furthermore, if the dot-like reflection portions 2 are increased in number and the light quantity of the light source 6 is made large, not only a function of a display apparatus but also a function of a planar illumination apparatus can be imparted.

Next, one example of a manufacturing method of the display apparatus 10 will be explained with reference to FIG. 10 to FIG. 12.

Figure 10:
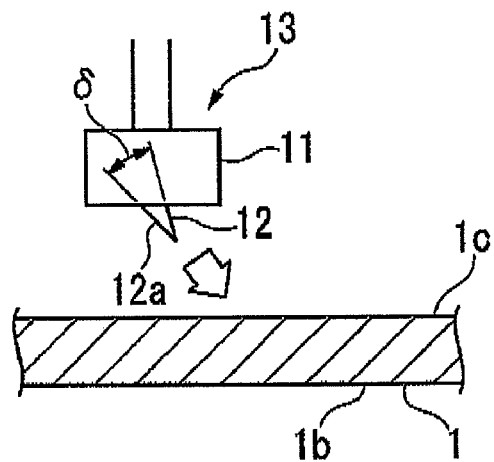
FIG. 10 is a procedural step diagram showing a manufacturing method of the display apparatus shown in FIG. 1.

As shown in FIG. 10, a machining tool 13 is used in which a blade portion 12 is protrudingly formed on a bottom surface of a base portion 11. The blade portion 12 is configured to have a shape in accordance with that of the dot-like reflection portion 2. The apex angle (the apex angle δ as shown in FIG. 10) of the blade portion 12 is preferably 10 to 40 degrees.

To form the reflection surface 2a smooth, it is preferable that an inclined surface 12a of the blade portion 12 for forming the reflection surface 2a be formed smooth accordingly. The surface roughness (the maximum height Ry) (JIS B 0601-1994) of the inclined surface 12a is preferably 1 μm or less, more preferably 0.1 μm or less.

Figure 11:
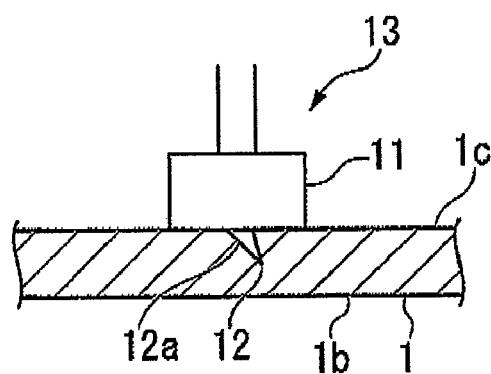
FIG. 11 is a procedural step diagram subsequent to the previous drawing.
Figure 12:
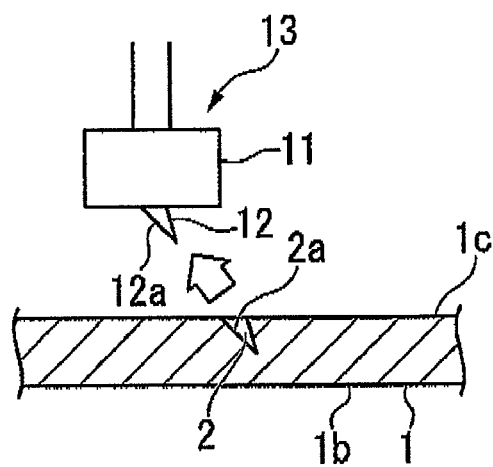
FIG. 12 is a procedural step diagram subsequent to the previous drawing.

As shown in FIG. 11 and FIG. 12, the machining tool 13 is descended along a formation direction of the blade portion 12 to press the blade portion 12 into the back surface 1c of the light guide plate 1. Then, the machining tool 13 is ascended to pull out the blade portion 12.

At this time, if one or both of the blade portion 12 and light guide plate 1 are heated to a temperature of the softening point of the material of the light guide plate 1 or higher, formation of the dot-like reflection portion 2 is facilitated.

As a result, the dot-like reflection portion 2 in a shape along the blade portion 12 is formed in the back surface 1c of the light guide plate 1.

Then the machining tool 13 is moved horizontally and the similar operation is repeated. Thereby, a display portion 3 made of a plurality of dot-like reflection portions 2 is formed to obtain the display apparatus 10 shown in FIG. 1 to FIG. 4.

According to the manufacturing method using the machining tool 13, a dot-like reflection portion 2 in an accurate shape can be formed. Furthermore, the reflection surface 2a can be formed smooth.

Figure 13:
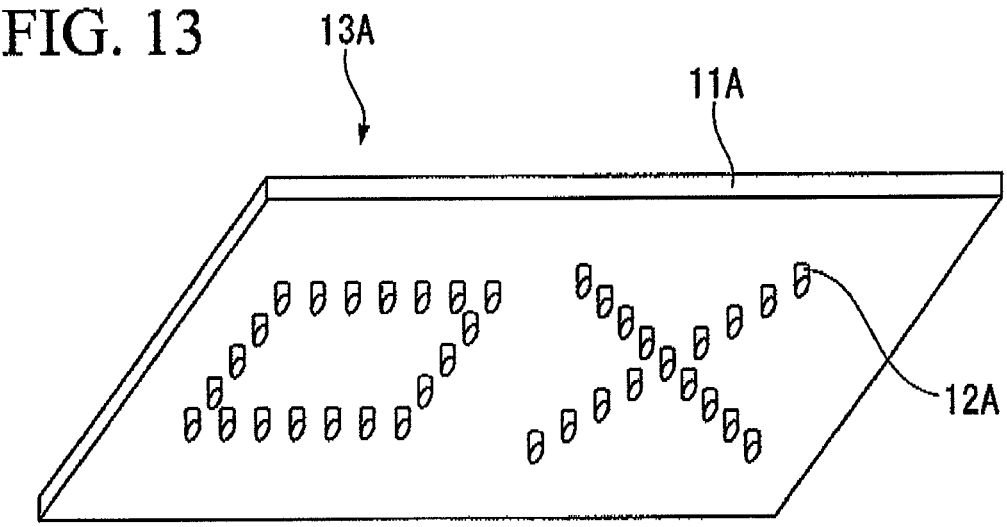
FIG. 13 is a plan view showing an example of a shape of a dot-like reflection portion, seen in a plane.

Moreover, for example, it is possible to use a machining tool 13A as shown in FIG. 13 to simultaneously form a display portion 3 made of a plurality of dot-like reflection portions 2.

The machining tool 13A includes: a metal base portion 11a in a rectangular, flat-plate shape; and a plurality of blade portions 12A that are protrudingly formed on a bottom surface of the base portion 11A. These blade portions 12A are disposed so as to correspond as a whole to a predetermined pattern formed by the dot-like reflection portions 2. The structure of the respective blade portions 12A is similar to that of the blade portion 12 as shown in FIG. 10. Therefore, its description is omitted.

Figure 14:
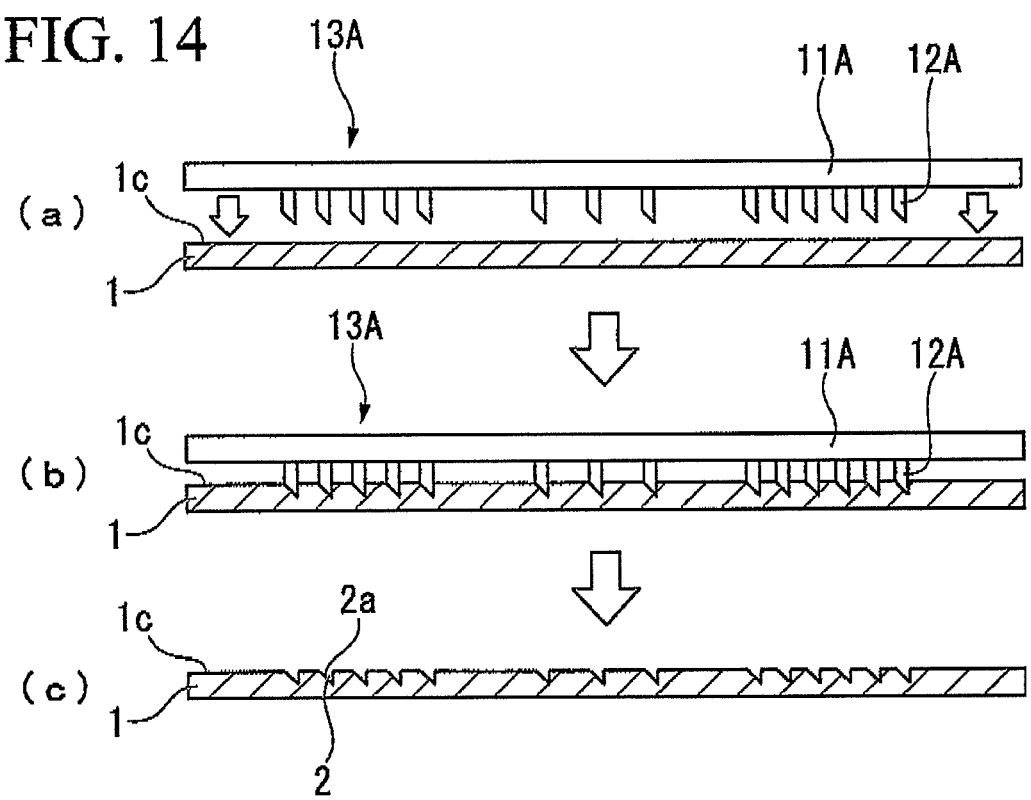
FIG. 14 is a plan view showing an example of a shape of a dot-like reflection portion, seen in a plane.

As shown in FIG. 14, the machining tool 13A is descended along a formation direction of the blade portions 12A (step (a) of FIG. 14) to press the blade portions 12A into the back surface 1c of the light guide plate 1 (step (b) of FIG. 14). Then, the machining tool 13A is ascended to pull out the blade portions 12.

Consequently, a plurality of dot-like reflection portions 2 in shapes along the blade portions 12 are simultaneously formed in the back surface 1c of the light guide plate 1 in a predetermined pattern which corresponds to positions of the blade portions 12A. As a result, the display apparatus 10 with a predetermined pattern of the dot-like reflection portions 2 is obtained (step (c) of FIG. 14).

At this time, if one or both of the blade portions 12 and light guide plate 1 are heated to a temperature of the softening point of the material of the light guide plate 1 or higher, formation of the dot-like reflection portions 2 is facilitated.

Other manufacturing methods include etching, cutting work, stamping, and injection molding.

Among these methods, cutting work, stamping, and injection molding have an advantage in that the reflection surface 2a can be formed comparatively smooth. Furthermore, etching, stamping, and injection molding can form even a small dot-like reflection portion 2 with good accuracy. Furthermore, etching and cutting work do not require a mold, and hence can reduce the manufacturing cost. Therefore, they have an advantage in the case of machining on a light guide plate with an especially large area, and of a small-lot production.

Next, a second embodiment of a display apparatus of the present invention will be explained. In the following description, constituent elements in common with those shown in FIG. 1 are designated with like reference numerals, and their description is omitted.

Figure 15:
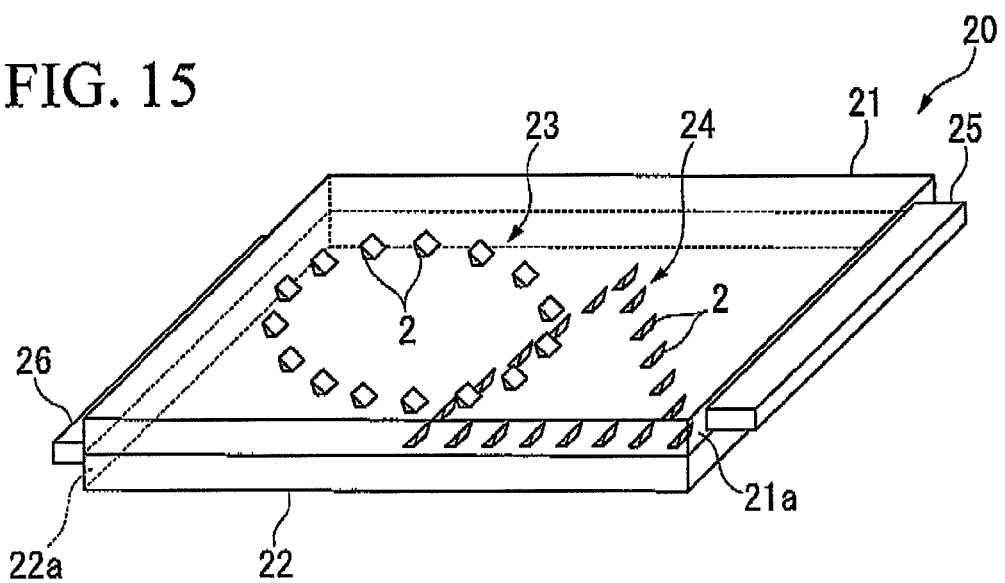
FIG. 15 is a perspective view schematically showing a second embodiment of a display apparatus of the present invention.
Figure 16:
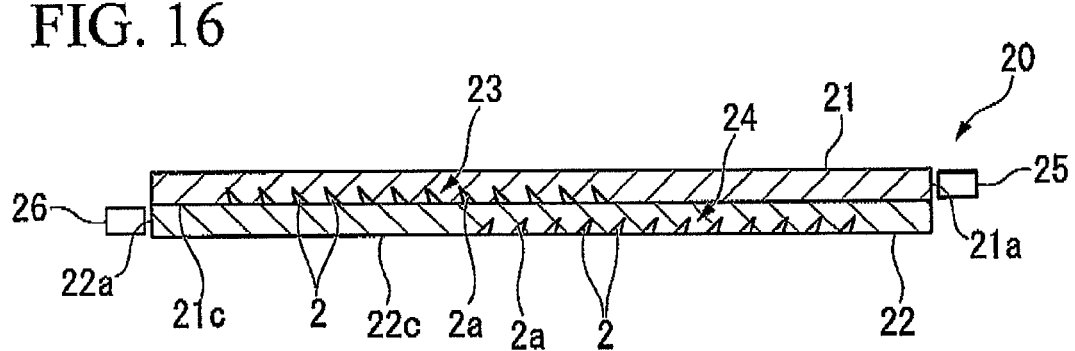
FIG. 16 is a cross-sectional view showing the display apparatus shown in FIG. 15.

As shown in FIG. 15 and FIG. 16, a display apparatus 20 includes: a first and second light guide plates 21, 22; and a first and second light sources 25, 26. The display apparatus 20 is different from the display apparatus 10 shown in FIG. 1 in that two light guide plates are provided.

The first and second light guide plates 21, 22 are stacked. On one edge face 21a of the first light guide plate 21, a first light source 25 is provided. On the other edge face 22a of the second light guide plate 22, a second light source 26 is provided.

On a back surface 21c of the first light guide plate 21, a first display portion 23 made of a plurality of dot-like reflection portions 2 is formed. The dot-like reflection portions 2 are positioned so as to form a predetermined pattern. In the example shown in the figure, they are arranged so as to substantially form a circle.

On a back surface 22c of the second light guide plate 22, a second display portion 24 made of a plurality of dot-like reflection portions 2 is formed. The dot-like reflection portions 2 are positioned so as to form a predetermined pattern. It is preferable that the second display portion 24 form a pattern different from that of the first display portion 23. In the example shown in the figure, they are arranged so as to substantially form a triangle.

In the display apparatus 20, the display portions 23, 24 may be simultaneously displayed by lighting both of the light sources 25, 26. Alternatively, either one of the display portions 23, 24 may be displayed by lighting either one of the light sources 25, 26. Furthermore, the display portion which is displayed can be changed over time through operations on the light sources 25, 26.

In this manner, the display apparatus 20 includes two light guide plates 21, 22, and these light guide plates 21, 22 include the display portions 23, 24, respectively. Therefore, it is possible to display a plurality of patterns, and hence designability of a displayed pattern can be enhanced.

In the display apparatus 20, the positions of the two light guide plates 21, 22 in the thickness direction are different from each other. This imparts a spatial effect to a displayed pattern. Therefore, a display effect and ornamentability are excellent.

The light sources 25, 26 may have a fixed time for light emission, a fixed amount of light emission, and a fixed color of emitted light. However, one or more of the amount of time for light emission, the amount of light emission, and the color of emitted light may be changed with the passage of time. The amount of light emission can be changed by changing an input power to these light sources.

With the modification of the amount of time for light emission, the amount of light emission, the color of emitted light, and the like of the light sources 25, 26, a change can be imparted to a displayed pattern.

For example, the order and the time of lighting of the light sources can be appropriately set, to thereby enable a display as if a figure (a pattern) moves. Therefore, a display effect can be further enhanced.

Figure 17:
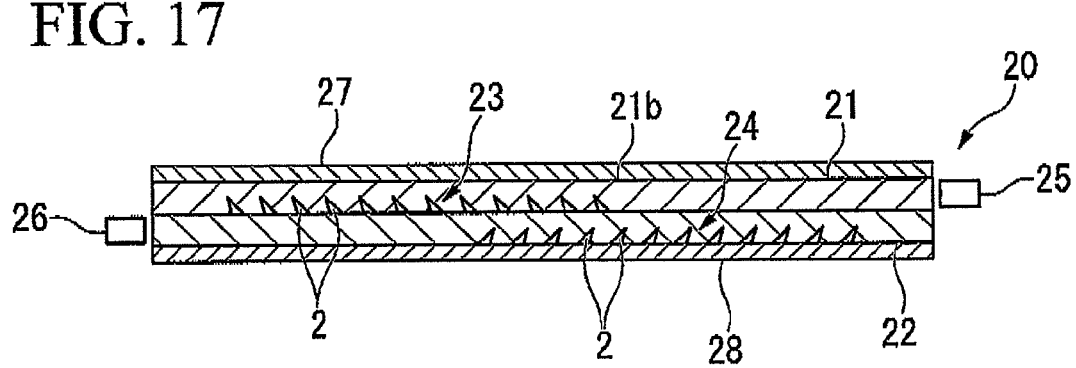
FIG. 17 is cross-sectional view showing a modification of the display apparatus shown in FIG. 15.

As shown in FIG. 17, protective plates 27, 28 can be provided respectively on the surface 21b of the light guide plate 21 and on the back surface 22c of the light guide plate 22. The protective plates 27, 28 may be made from any material as long as it is transparent. Preferable materials include a synthetic resin such as an acrylic resin and a polycarbonate resin, and a glass.

With the protective plates 27, 28, the endurance of the display apparatus 20 can be enhanced.

Next, a third embodiment of a display apparatus of the present invention will be explained.

Figure 18:
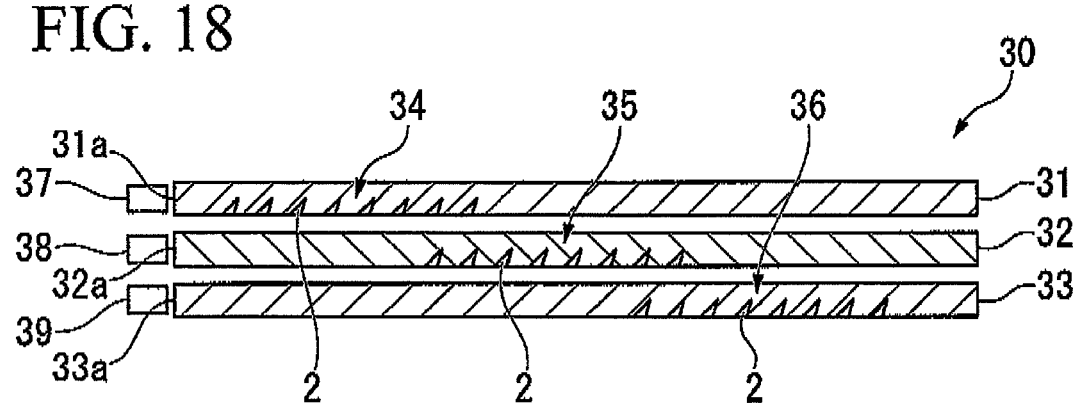
FIG. 18 is a cross-sectional view showing a third embodiment of a display apparatus of the present invention.

As shown in FIG. 18, a display apparatus 30 includes: first to third light guide plates 31 to 33; and first to third light sources 37 to 39.

On back surfaces of the first to third light guide plates 31 to 33, there are respectively formed first to third display portions 34 to 36 made of a plurality of dot-like reflection portions 2.

The display apparatus 30 is different from the display apparatus 20 shown in FIG. 15 in that the first to third light guide plates 31 to 33 are disposed in a spaced-apart manner in the thickness direction.

The first to third light sources 37 to 39 are respectively provided on an edge face 31a of the first light guide plate 31, an edge face 32a of the second light guide plate 32, and an edge face 33a of the third light guide plate 33.

In the display apparatus 30, the first to third light guide plates 31 to 33 are arranged in a spaced-apart manner in the thickness direction. Therefore, it can impart a more spatial effect to a displayed pattern than the display apparatus 20. As a result, designability of a displayed pattern can be enhanced.

Note that the number of the light guide plates is not limited to that of the example shown in FIG. 15 to FIG. 18, and may be four or more.

Next, a fourth embodiment of a display apparatus of the present invention will be explained.

Figure 19:
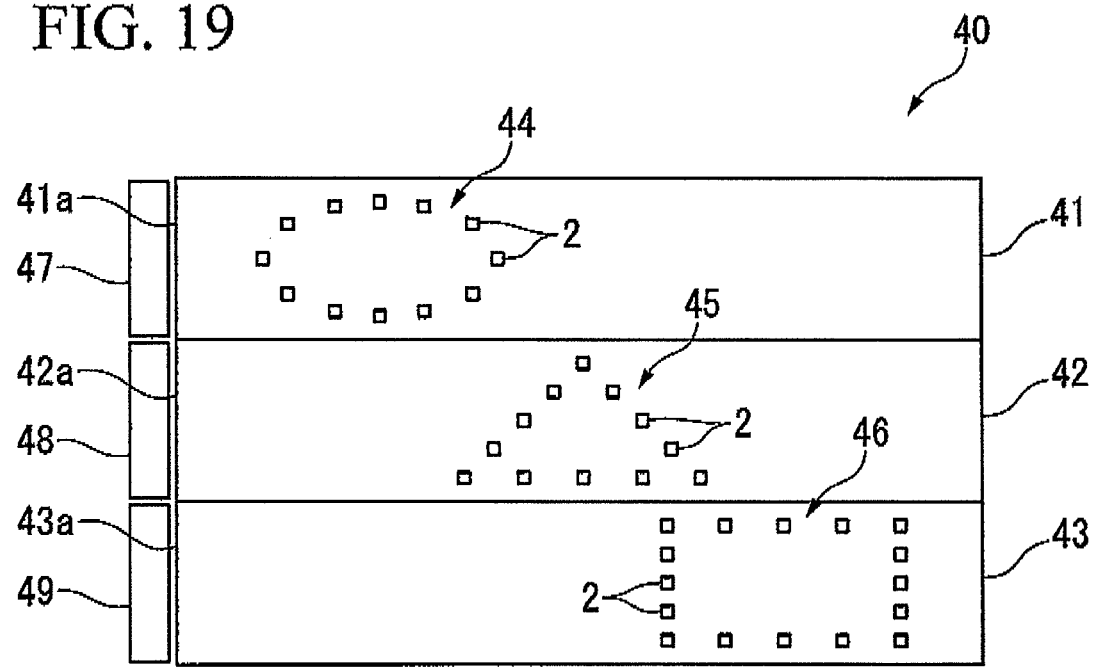
FIG. 19 is a plan view showing a fourth embodiment of a display apparatus of the present invention.

FIG. 19 is a plan view of a display apparatus 40. The display apparatus 40 includes: first to third light guide plates 41 to 43; and first to third light sources 47 to 49.

On back surfaces of the first to third light guide plates 41 to 43, first to third display portions 44 to 46 are respectively formed made of a plurality of dot-like reflection portions 2.

The display apparatus 40 is different from the display apparatus 30 shown in FIG. 18 in that the first to third light guide plates 41 to 43 are arranged side by side within one plane.

The first to third light sources 47 to 49 are respectively provided on an edge face 41a of the first light guide plate 41, an edge face 42a of the second light guide plate 42, and an edge face 43a of the third light guide plate 43.

The light guide plates 41 to 43 are laid side by side without any opaque matter interposed therebetween. Therefore, they can be actually treated as one light guide plate.

In the display apparatus 40, the light guide plates 41 to 43 are arranged in one plane side by side. Therefore, an area of the display portion can be enlarged.

Furthermore, in the display apparatus 40, the light sources 47 to 49 may be all lit to simultaneously display the display portions 44 to 46. Alternatively, one or two of the light sources 47 to 49 may be lit to display one or two of the display portions 44 to 46. Furthermore, the display portion which is displayed can be changed over time through operations on the light sources 47 to 49.

In this manner, in the display apparatus 40, it is possible to display a plurality of patterns, and hence designability of a displayed pattern can be enhanced.

Next, a fifth embodiment of a display apparatus of the present invention will be explained.

Figure 20:
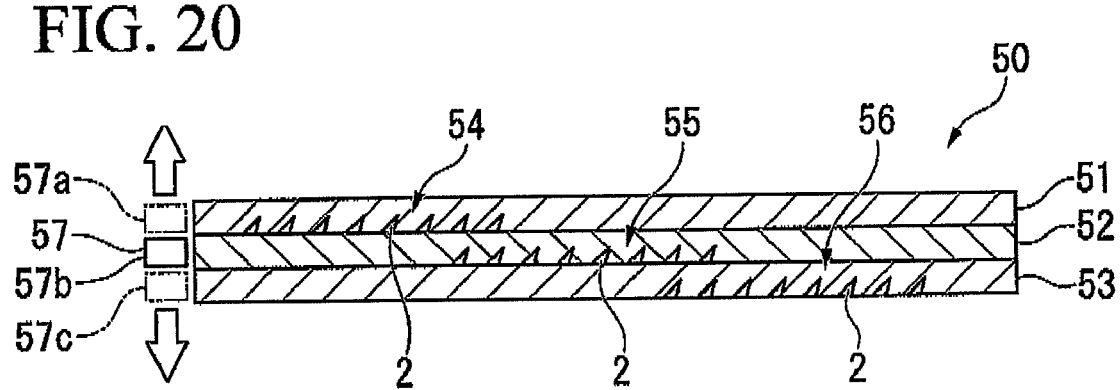
FIG. 20 is a cross-sectional view showing a fifth embodiment of a display apparatus of the present invention.

As shown in FIG. 20, a display apparatus 50 includes: first to third light guide plates 51 to 53; and a light source 57.

On back surfaces of the light guide plates 51 to 53, first to third display portions 54 to 56 made of a plurality of dot-like reflection portions 2 are respectively formed. The light guide plates 51 to 53 are stacked on top of each other.

It is configured such that the light source 57 is movable from a position capable of entering a light beam into the first light guide plate 51 (a first position 57a), through a position capable of entering a light beam into the second light guide plate 52 (a second position 57b), to a position capable of entering a light beam into the third light guide plate 53 (a third position 57c).

The first to third positions 57a to 57c are positions facing the light guide plates 51 to 53, respectively.

The display apparatus 50 can change a display portion which is displayed by the movement of the light source 57. For example, by moving the light source 57 from the first position 57a to the third position 57c with the passage of time, the display portions can be displayed in a switching manner, enabling a display with excellent visibility.

In the example shown in the figure, the light source 57 is movable with respect to the light guide plates 51 to 53. However, contrary to this, the light guide plates 51 to 53 may be movable with respect to the light source 57.

Next, a sixth embodiment of a display apparatus of the present invention will be explained.

Figure 21:
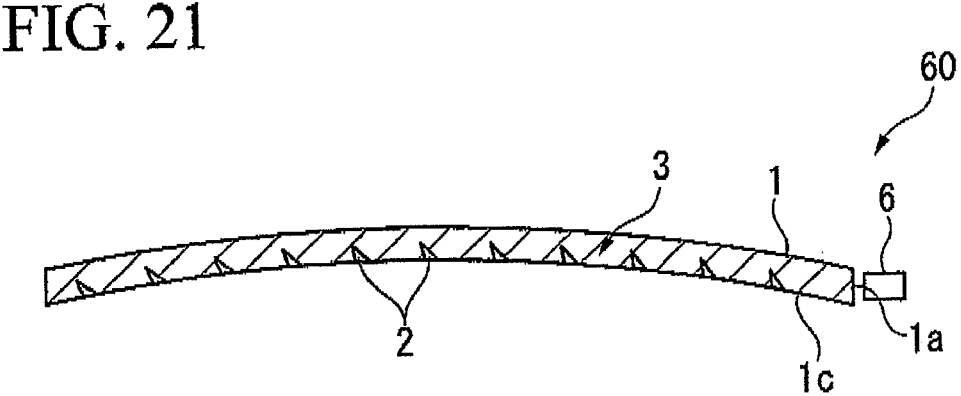
FIG. 21 is a cross-sectional view showing a sixth embodiment of a display apparatus of the present invention.

As shown in FIG. 21, a display apparatus 60 is different from the display apparatus 10 shown in FIG. 1 in that a light guide plate 1 is curved in a substantially arc-shaped manner.

In the display apparatus 60, the light guide plate 1 is curved. Therefore, a display portion 3 is visually recognizable from a wider range.

In the example shown in the figure, the entirety of the light guide plate 1 is curved. However, the display apparatus of the present invention is not limited to this. A part of the light guide plate 1 may be curved.

The display apparatus of the present invention can be used also as a blind apparatus (an image shielding apparatus), because when the light source is lit to display the display portion, it becomes difficult to visually recognize the background.

That is, in the display apparatus of the present invention, the dot-like reflection portions 2 have light reflection portions in the shape of a dot. That is, the light reflection portions are of dot-like shape. Therefore, each of the dots occupies a small area in the display apparatus. As a result, when the light is off and no reflection light beam is coming from the dots, the transparency of the light guide plate 1 is not impaired, and hence the background on the backside of the display apparatus is seen through. Consequently, the background can be visually recognized with ease.

On the other hand, when the light is on and the dot-like reflection portions 2 function as luminescent spots with high luminance. In the vicinity thereof, visibility of the background is lowered due to glare. Therefore, with the arrangement of the dot-like reflection portions 2 with an appropriate spacing within a necessary range, it is possible to lower visibility of the background in the region in a light-on time.

Figure 22:
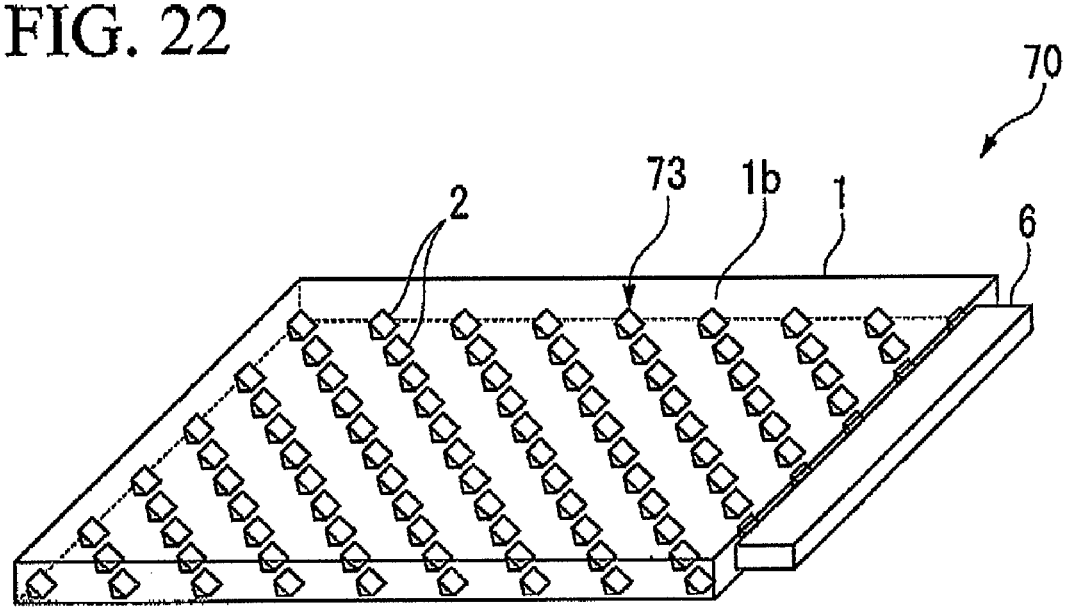
FIG. 22 is a perspective view showing one example of a blind apparatus of the present invention.

FIG. 22 shows one example of a blind apparatus of the present invention. This blind apparatus 70 includes: a light guide plate 1; and a light source 6. On a back surface 1c of the light guide plate 1, there is formed a display portion 73 made of a multitude of dot-like reflection portions 2.

It is preferable that the dot-like reflection portions 2 be uniformly formed over the entirety of a predetermined region of the light guide plate 1. In the example shown in the figure, the dot-like reflection portions 2 are formed with substantially a regular spacing, and uniformly formed over the entire surface of the light guide plate 1.

Figure 23:
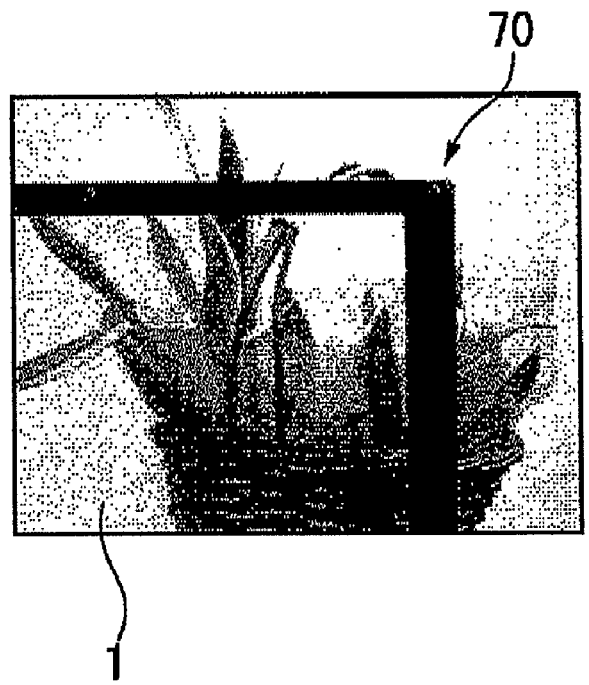
FIG. 23 is an explanatory diagram schematically showing an example of use of the blind apparatus shown in FIG. 22.

As shown in FIG. 23, when the light source is not lit, it is possible to see the background through the blind apparatus 70.

Figure 24:
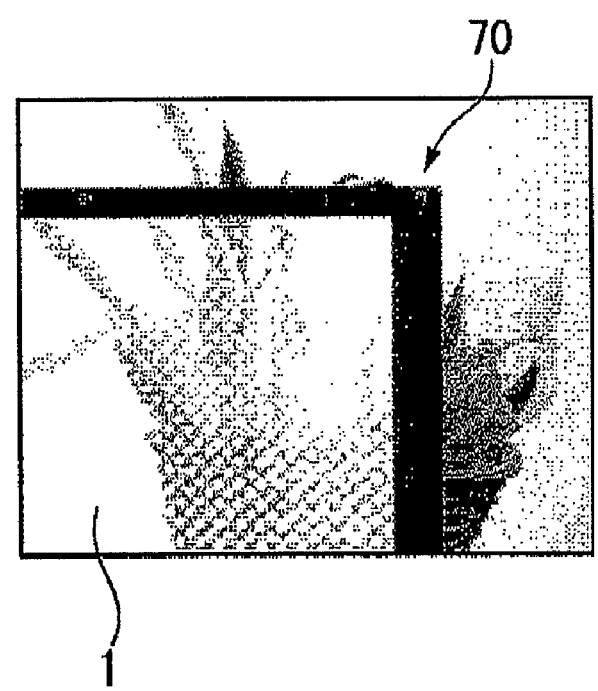
FIG. 24 is an explanatory diagram schematically showing an example of use of the blind apparatus shown in FIG. 22.

As shown in FIG. 24, when the light source is lit, the multitude of dot-like reflection portions 2 function as luminescent spots with high luminance, thereby to make it difficult to see the background.

In general, a blind apparatus requires both of a shielding effect of making the background hard to see and an easiness of seeing the background in a non-shielded time, that is, a background visibility.

For example, in an apparatus whose display portion is formed through surface roughing by laser machining or the like, luminance of the display portion is likely to be insufficient. Therefore, this is inferior in shielding effect. Furthermore, in an apparatus whose display portion is formed of LED elements on a transparent base material, the LED elements make it difficult to see a background even when they are not lit.

In addition, to obtain a sufficient shielding effect when the light is on, a multitude of LED elements are required. This leads to another problem of increased cost.

In contrast to this, in the blind apparatus 70 according to the present invention, a sufficient light transmittance is ensured as described above. Therefore, when the light source is not lit, it is possible to visually recognize the background favorably. When the light source is lit, a multitude of dot-like reflection portions 2 function as luminescent spots with high luminance, making it difficult to see the background. Therefore, it is possible to utilize the blind apparatus 70 for the purpose of privacy protection.

If the blind apparatus 70 is applied to the doors of a piece of furniture such as a kitchen cabinet, it is possible to make it difficult to see things behind the doors when for example there is a visitor present. Therefore, this is effective for privacy protection.

Note that the positions and the number of the light sources are not limited to the examples shown in the figures. It is preferable that the degrees of the inclination angle of the reflection surface of the dot-like reflection portion be optimized according to the positions of the light sources so as to obtain a high reflection efficiency.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the present invention, it is possible to provide a display apparatus which is excellent in transparency, has a display portion visually recognizable with ease, can be manufactured at low cost, and allows a modification in a display portion with ease, and to provide a manufacturing method thereof. Furthermore, according to the present invention, it is possible to provide a pattern display method using this display apparatus, and a blind apparatus and a blinding method using this display apparatus.

The invention claimed is:

1. A manufacturing method of the display apparatus comprising the steps of;
    heating at least one of a blade portion of a machining tool and a light guide plate configuring the display apparatus to a softening point of a material of the light guide plate or higher; the blade portion being composed of a protrusion having a planar and smooth surface,
    descending the machining tool along a specific formation direction of the blade portion all through this descending step to press the blade portion into a back surface of the light guide plate, the specific formation direction of the blade portion is different from a direction perpendicular to the back surface of the light guide plate,
    ascending the machining tool along a specific formation direction of the blade portion all through this ascending step to pull out the blade portion from the light guide plate, the specific formation direction of the blade portion is different from a direction perpendicular to the back surface of the light guide plate,
    moving the machining tool horizontally, and
    arranging at least one light source composed of a plurality of light emitting devices along at least one edge face of the light guide plate, wherein the steps of descending, ascending, and horizontally moving the machining tool are performed repeatedly, to form a display portion that is made of a plurality of dot-like reflection portions in a shape in accordance with a shape of the blade portion so that each dot-like reflection portions is composed of a notch having a reflection surface corresponding to the planar and smooth surface of the blade portion and each of the reflection surfaces are parallel to each other,
    the reflection surface reflects a light beam emitted from the light source and incident from the edge face, to a surface, and
    the display portions are formed with a structure with sections where the dot-like reflection portions are densely disposed and where the dot-like reflection portions are sparsely disposed so that reflected light beams from the dot-like reflection portions can be visually recognizable as a predetermined irregular pattern on the entire light emitting plane.

2. A manufacturing method of a display apparatus according to claim 1, wherein the dot-like reflection portions are arranged so as to form a letter, a sign, a graphic form, a designed pattern, or a combination of two or more of these.

3. A manufacturing method of a display apparatus comprising the steps of:
    heating at least one of a plurality of blade portions of a machining tool and a light guide plate configuring the display apparatus to a softening point of a material of the light guide plate or higher; each of the blade portions being composed of a protrusion having a planar and smooth surface, the planar and smooth surfaces of the machining tool being parallel to each other, descending the machining tool along a specific formation direction of the blade portion all through this descending step to press the blade portion into a back surface of the light guide plate, the specific formation direction of the blade portion is different from a direction perpendicular to the back surface of the light guide plate, the blade portion into the back surface of the light guide plate, ascending the machining tool along a specific formation direction of the blade portion all through this ascending step to pull out the blade portion from the light guide plate, the specific formation direction of the blade portion is different from a direction perpendicular to the back surface of the light guide plate, and arranging at least one light source composed of a plurality of light emitting devices along at least one edge face of the light guide plate, wherein the steps of descending and ascending are performed to form a display portion that is made of a plurality of dot-like reflection portions in a shape in accordance with a shape of the blade portion so that each dot-like reflection portions is composed of a notch having a reflection surface corresponding to the planar and smooth surface of the machining tool and each of the reflection surfaces are parallel to each other, the reflection surface reflects a light beam emitted from the light source and incident from the edge face, to a surface, and the display portions are formed with a structure with sections where the dot-like reflection portions are densely disposed and where the dot-like reflection portions are sparsely disposed so that reflected light beams from the dot-like reflection portions can be visually recognizable as a predetermined irregular pattern on the entire light emitting plane.

4. A manufacturing method of a display apparatus according to claim 3, wherein the dot-like reflection portions are arranged so as to form a letter, a sign, a graphic form, a designed pattern, or a combination of two or more of these.

* * * * *